United States Patent [19]

Lang

[11] Patent Number: 5,285,125
[45] Date of Patent: Feb. 8, 1994

[54] SHORT-CIRCUITING AND BRUSH-LIFTING DEVICE FOR ASYNCHRONOUS MOTORS EQUIPPED WITH A SLIP-RING ROTOR

[75] Inventor: Karl Lang, Berlin, Fed. Rep. of Germany

[73] Assignee: Siemens Aktiengesellschaft, Munich, Fed. Rep. of Germany

[21] Appl. No.: 934,699

[22] PCT Filed: Jan. 23, 1991

[86] PCT No.: PCT/DE91/00074

§ 371 Date: Nov. 23, 1992

§ 102(e) Date: Nov. 23, 1992

[87] PCT Pub. No.: WO91/15050

PCT Pub. Date: Oct. 3, 1991

[51] Int. Cl.$^5$ .................... H02K 13/00; H01R 39/42
[52] U.S. Cl. .................... 310/240; 310/232; 310/244
[58] Field of Search ............ 310/240, 229-233, 310/241, 244

[56] References Cited

U.S. PATENT DOCUMENTS

| | | | |
|---|---|---|---|
| 575,918 | 1/1897 | Wheeler | 310/240 |
| 1,228,710 | 6/1917 | Steen | 310/240 |
| 1,231,844 | 7/1917 | Brown | 310/240 |
| 1,661,014 | 2/1928 | Schmock | 310/232 |
| 1,985,395 | 12/1934 | Anderson | 310/240 |
| 2,353,317 | 7/1944 | Nardone | 310/240 |
| 2,377,260 | 5/1945 | Nardone | 310/240 |
| 2,472,018 | 5/1949 | Johnson | 310/240 |
| 3,278,777 | 10/1966 | Grooms | 310/240 |
| 3,879,624 | 4/1975 | Jones | 310/240 |

FOREIGN PATENT DOCUMENTS 1005173 3/1957 Fed. Rep. of Germany.

OTHER PUBLICATIONS

Moeller Werr: Leitfaden der Elektrotechnik, vol. 3, "Konstruktion und Festigkeitsberechnungen elektrischer Maschinen", third Edition, pp. 117-122.

Primary Examiner—Steven L. Stephan
Assistant Examiner—D. R. Haszko
Attorney, Agent, or Firm—Kenyon & Kenyon

[57] ABSTRACT

A short-circuiting and brush-lifting device comprises a rotatable actuating ring having with brush-actuating rods levers cause the brushes of the motor to lift up via the rotating actuating after the slip rings have been short-circuited as a result of the axial displacement of a short-circuiting ring. To make the device wear-resistant and insensitive to contamination, the actuating ring supports three rollers, with which it abuts in the starting position on the spring-loaded short-circuiting ring. The actuating ring is guided exactly in parallel by three axial guide rods, which are disposed perpendicularly to the brush-actuating rods. The configuration of all articulated joints of these rods is adjusted so as to allow the points of maximum excursion of the deflection of the articulated joint of the axial guide rods and the brush-actuating rods are exhibited at staggered times. In this manner the brush-actuating rod runs through its point of maximum excursion first and, after that, the axial rod runs through its point of maximum excursion. The clearance between the short-circuit contacts of the short-circuiting ring and the short-circuit contacts of the slip rings is smaller in the starting position is than the axial movement of the actuating ring during the short-circuiting operation, so that the brushes do not lift up until after the short-circuiting operation has taken place.

18 Claims, 4 Drawing Sheets

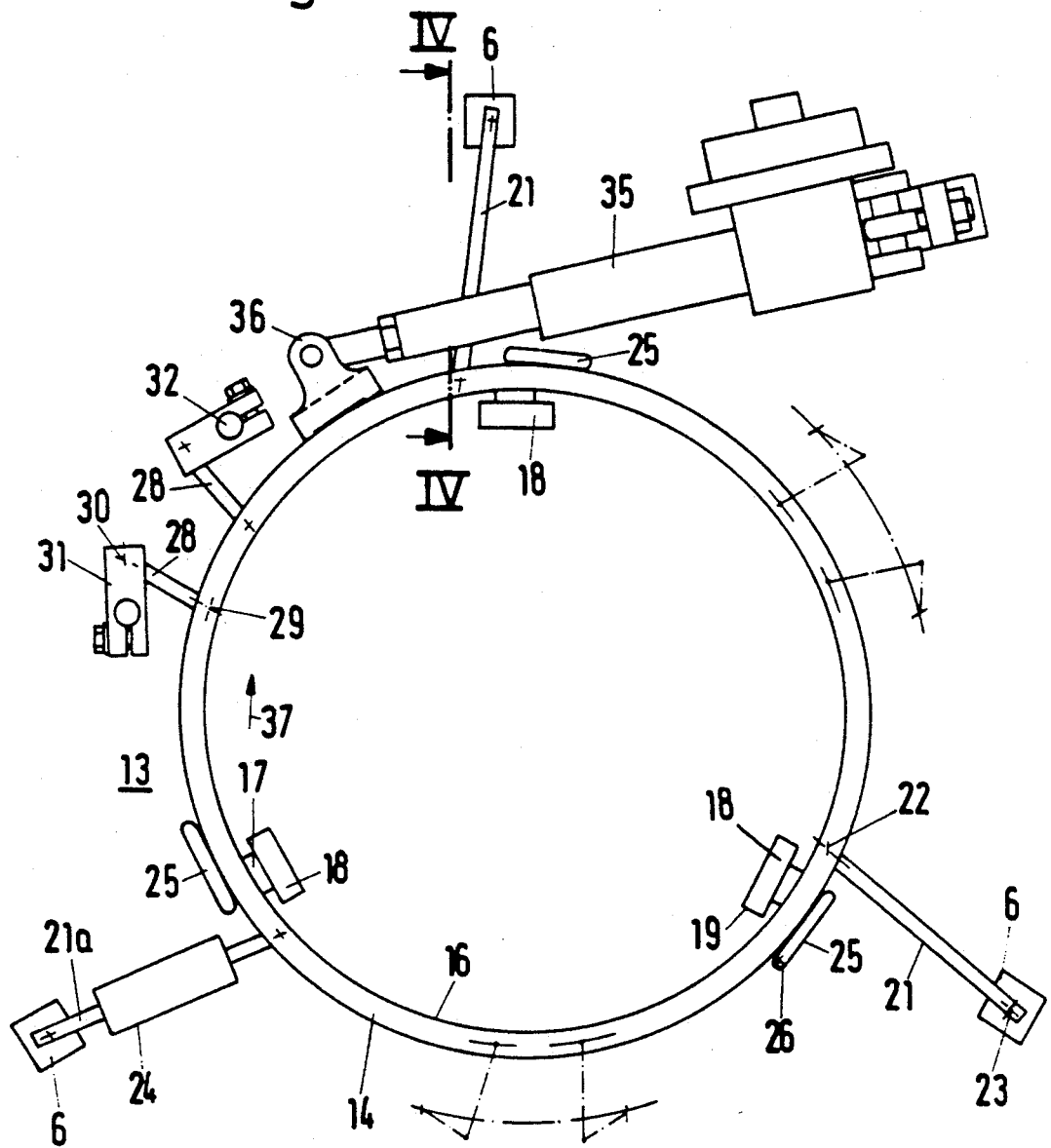

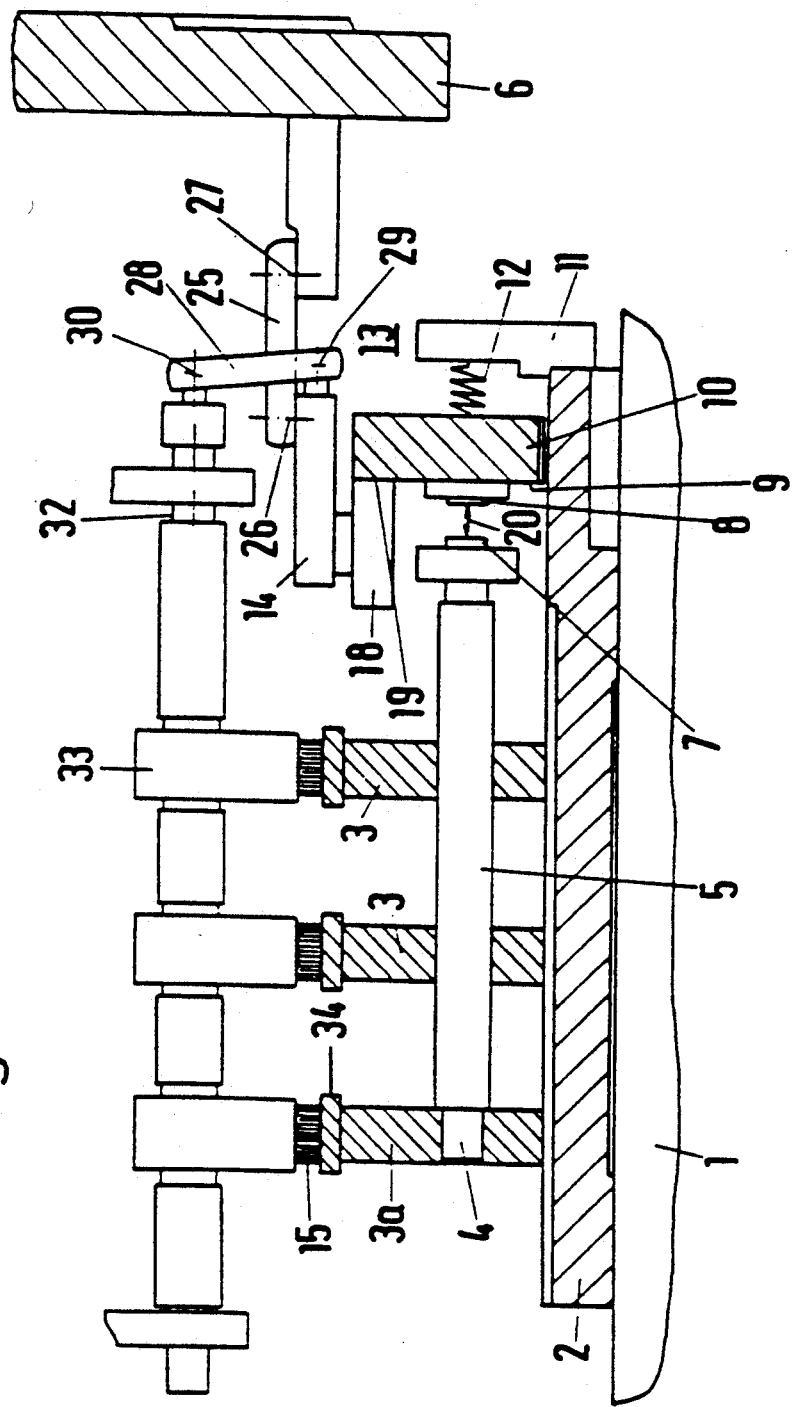

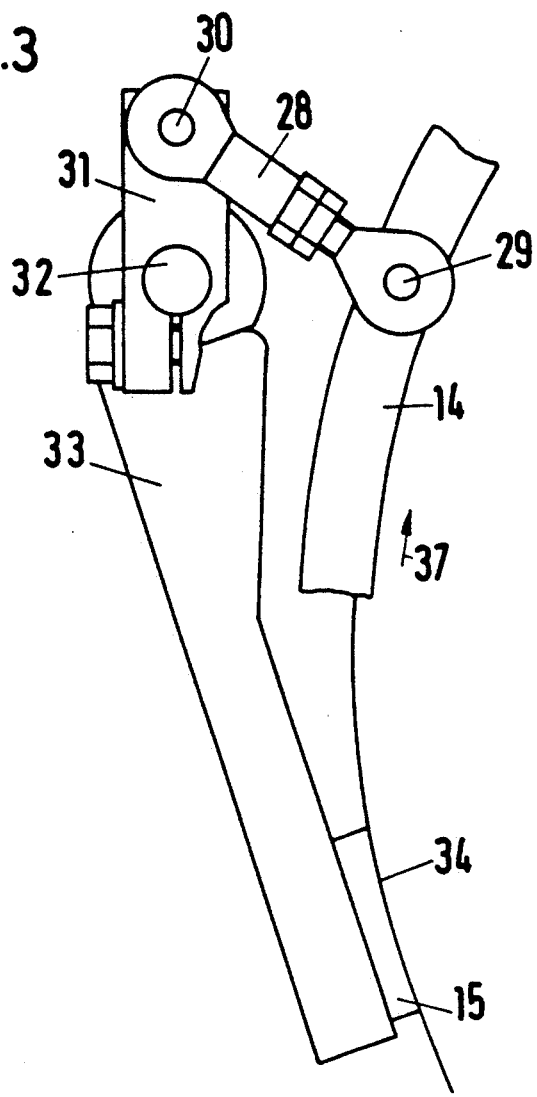
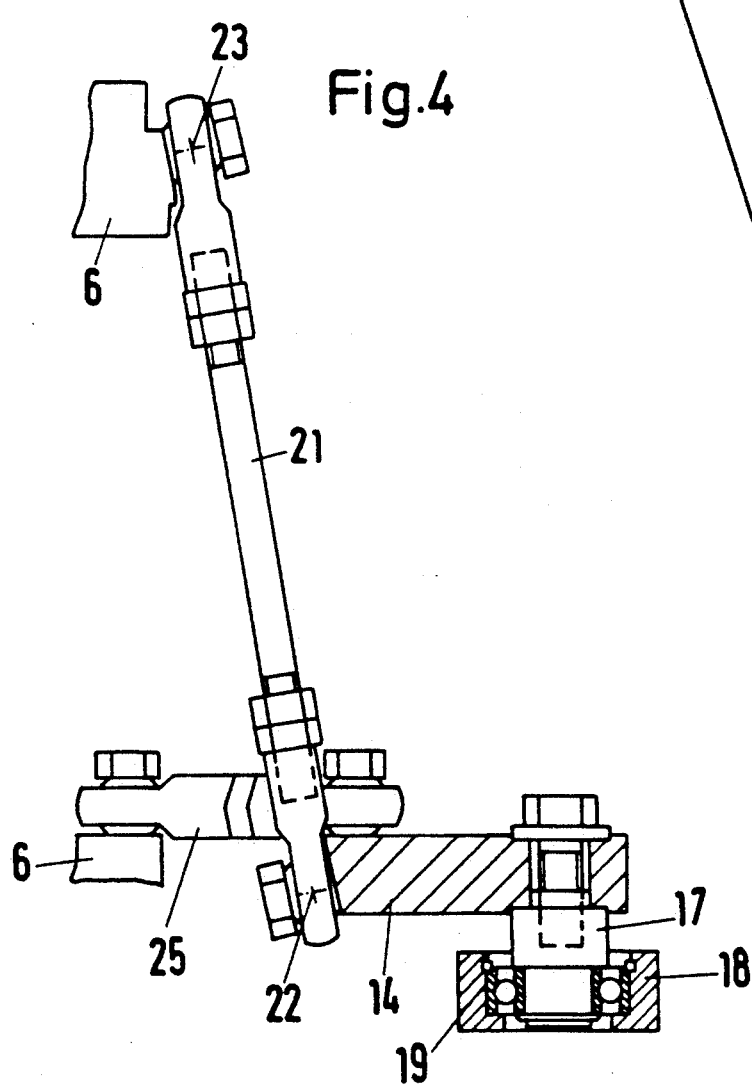

SHORT-CIRCUITING AND BRUSH-LIFTING DEVICE FOR ASYNCHRONOUS MOTORS EQUIPPED WITH A SLIP-RING ROTOR

BACKGROUND OF THE INVENTION

The invention relates to a short-circuiting and brush-lifting device for asynchronous motors equipped with a slip-ring rotor. In such a rotor the slip rings have short-circuit contacts without any axial spring mounting, which enable the slip rings to be short-circuited by a short-circuiting ring that is displaceable in the axial direction. This device also includes a device for triggering the axial displacement of the short-circuiting ring and a rotatably supported actuating ring. The actuating ring surrounds the rotor shaft and can twist between a starting position and an operating position. Guide rods (brush-actuating rods) having the same length are secured on the actuating ring by articulated. With the assistance of levers, these guide rods cause the brush-holder studs to rotate and the brushes to lift up only when the slip rings have been short-circuited.

A known short-circuiting and brush-lifting device is disclosed in the article by Moeller Werr in Electronic Engineering Handbook (Leitfaden der Elektrotechnik), vol. III Design and Strength Calculations for Electrical Machines (Konstruktion und Festigkeitsberechnungen elektrischer Maschinen), third edition, p. 122, in particular illustration 122.1. These devices are used so that after the slip-ring rotor runs up to speed over resistance, the asynchronous motor with its short-circuited rotor winding and lifted brushes can operate with low losses and without wearing out the brushes.

In this known device, the actuating ring is supported in rollers and rotatably secured to end shield. It serves to join several brush-holder studs with guide rods or lugs having the same length, which are each secured by an articulated joint to the periphery of the actuating ring and are uniformly distributed around the periphery. If the actuating ring is turned by gear teeth, which gear into a gear wheel, in the direction allocated to short-circuiting, then, the guide rods effect a rotation of the brush-holder studs with levers and lift up the brushes. A cam is connected to the gear wheel that triggers the rotation of the actuating ring, which causes the short-circuiting ring to be displaced in the axial direction. However, this short-circuiting ring contacts the short-circuit contacts of the slip rings before the brushes are lifted up and consequently short-circuits them. Since force is introduced to the short-circuiting ring at only one single point, there exists a danger that the short-circuiting ring will become skewed, because it is small in length in relation to the inside diameter. By providing a bearing arrangement on the rotor shaft with a small clearance to prevent this, this arrangement would also be sensitive to contamination, in the same way as the gear tooth engagement and the cam. Moreover, this short-circuiting and brush-lifting device is expensive, since different devices are provided for short-circuiting the slip rings and for raising the brushes.

In German Patent Number 10 05 173, an electrical machine is described having a short-circuiting and brush-lifting device. This device has a ring supported in the brush carrier housing for short-circuiting the slip rings and raising and lowering the brushes. The slip rings are short-circuited by toggle switches, which are actuated by an axially displaceable connector ring. The connector ring is moved with the assistance of a connecting link guide via a rotatable control ring. Levers for actuating the brush-lifting device are also connected to the control ring.

However, it is costly and difficult to convert a rotary motion into the axial movement of the connector ring. Moreover, there is a danger that the connector ring could become skewed.

An object of the present invention is to provide a short-circuiting and brush-lifting device which works with the lowest possible rate of wear and is insensitive to contamination.

SUMMARY OF THE INVENTION

This and other objectives are met by the short-circuiting and brush-lifting device of the present invention. A short-circuiting and brush-lifting device is provided according to the invention so that the actuating ring is guided in parallel via three axially aligned guide rods (axial rods) having the same length. The guide rods are uniformly distributed over the circumference of the actuating ring and are permanently supported on one side and, in each case, support a roller on its inner surface, on three radial axes that are uniformly distributed over the periphery. The surface area of the roller abuts, in the starting position, on the end face of the short-circuiting ring facing the slip rings. The short-circuiting ring is spring-loaded in the direction of the rollers, or rather in the direction of the short-circuit contacts. The brush-actuating rods are aligned perpendicularly to the axial rods. Also, according to the invention the respective fixing points of the rods (axial rods and brush-actuating rods) are selected so that, as a result of the deflection occurring during the short-circuiting rotation of the actuating ring, the fixing points that are not stationary will pass through time-staggered points of maximum excursion. Initially, the fixing points of the brush-actuating rods will run through their point of maximum excursion and, subsequently, the fixing points of the axial rods will run through their point of maximum excursion. The clearance between the short-circuit contacts and the end face of the short-circuiting ring in the starting position is smaller than the axial movement of the actuating ring between the starting position and the operating position.

In the short-circuiting and brush-lifting device of the invention, both the movement of the short-circuiting ring for short-circuiting the slip rings and the lifting of the brushes are triggered by the actuating ring. This is because this actuating ring is also displaced in the axial direction as a result of the special formation of its bearing arrangement during the rotary motion between the starting position and the operating position. During this displacement, it is guided exactly in parallel by the axial guide rods. As a result of the balanced configuration of the fixing points that constitute the articulated joints in each of the guide rods (axial rods and brush-actuating rods), which are connected to the actuating ring and, in addition, are perpendicular to one another, the points of maximum excursion of the particular axial displacement of the freely movable fixing points of the guide rods are run through during the rotation of the actuating ring at staggered times. Thus, the the brushes are not lifted until the slip rings have been short-circuited.

The short-circuiting ring is spring-loaded in the direction of the rollers attached to the actuating ring and in the direction of the short-circuit contacts of the slip rings. Therefore, when the asynchronous motor is at a standstill, (i.e.. when the actuating ring is in the starting position,) the short-circuiting ring is pressed by springs against the surface area of the three rollers arranged uniformly on the periphery of the actuating ring. Since a uniform, three-point bearing arrangement is provided, on the end face of the short-circuiting ring, the short-circuiting ring is also prevented from becoming skewed during the axial movement.

Each of the guide rods connected to the actuating ring has one fixed and one freely movable fixing point. The axial guide rods, the fixing point (articulated joint) is freely movable on the actuating ring, since its bearing arrangement allows both a rotation as well as an axial displacement. For the brush-actuating rods, the articulated joint on the actuating ring is considered because fixed, as it must follow the movement of the actuating ring. On the other hand, the other articulated joint, which leads to a lever that is connected to the brush-holder stud, can move freely. The axial guide rods and the brush-actuating rods are perpendicular to one another, and the configuration of the specific, stationary fixing points of the guide rods is adjusted to the respective movable articulated joints in a way that enables the points of maximum excursion of the particular movements of the movable fixing points of the guide rods to be run through at staggered times (i.e., sequentially). As a result, the initial displacement of the free fixing points of the brush-actuating rods when the actuating ring rotates out of the starting position in the short-circuiting direction is very small, since the fixing points run through their points of maximum excursion. Accordingly, the levers and brush-holder studs are hardly turned. On the other hand, the axial rods give rise to a relatively large axial deflection of the actuating ring, since their movable fixing point on the actuating ring has not yet reached the point of maximum excursion. Consequently, the axial movement is substantial. Also the displacement of the short-circuiting ring is great in the direction of the slip rings.

The clearance between the short-circuit contacts and the end face of the short-circuiting ring in the starting position is smaller than the axial movement of the actuating ring in the short-circuit direction between the starting position and the operating position. Because of this relationship the short-circuiting ring following the actuating ring in its axial displacement reaches the short-circuit contacts of the slip rings, comes to abut against them, and short-circuits them with a contact pressure corresponding to the spring resilience, before the movement of the brush-actuating rods in the circumferential direction after the point of maximum excursion becomes so great that the rotation of the brush-holder stud releases the brushes so they can lift up. While the brushes are being lifted up from the slip rings, however, the surface areas of the rollers move away from the end face of the short-circuiting ring, following the additional, now only slight axial movement of the actuating ring. Therefore, during normal operation of the asynchronous rotor with a short-circuited rotor winding, neither the brushes contact the slip rings nor the rollers abut on the short-circuiting ring. As a result, the machine can be operated with low losses and with a low rate of wear.

Apart from the low-friction bearing arrangement of the actuating ring, another advantage of the short-circuiting and brush-lifting device is that the rollers of the actuating ring abut on the short-circuiting ring from the time the asynchronous motor is at standstill until the slip rings are short-circuited. When the asynchronous motor runs up to speed over resistance, the rollers of the actuating ring are also accelerated, together with the short-circuiting ring, which rotates with the rotor shaft. This acceleration is surge-free and has no effect on the actuating ring. Therefore, since there is no relative movement between the surface areas of the rollers and the end face of the short-circuiting ring, thee wear that the rollers are subject to also remains at a minimum.

Since the three-point introduction of force between the actuating ring and the short-circuiting ring prevents the short-circuiting ring from becoming skewed, its bearing arrangement can be easily developed on small guide surfaces with a relatively large amount of play. As a result, the short-circuiting and brush-lifting device is also insensitive to contamination.

It is advantageous for the actuating ring to be supported in three radially aligned guide rods (radial rods), which are uniformly distributed over the periphery of the actuating ring and are permanently fixed on one side. The actuating ring can then also execute the axial displacement that occurs during rotation with a low rate of friction and wear. For this purpose, two of the radial guide rods can effectively have the same rigid length, while the third radial guide rod has a variable length. In this manner, the rotatable bearing arrangement of the actuating ring can follow the relatively complicated movement of the actuating ring with a low rate of friction and without resistance during the rotation from the starting position to the operating position. In this case, it is a roughly helical movement.

The fixing points of the guide rods in the short-circuiting and brush-lifting device have a particularly low rate of friction and wear when they are designed as articulated joints with ball-joint heads. The short-circuiting ring can advantageously be supported on slide pins, through which the bearing arrangement becomes insensitive to contamination.

BRIEF DESCRIPTION OF THE DRAWINGS

FIG. 1 is a cross-sectional view of the short-circuiting and brush-lifting device as viewed in the direction of the end shield (without a short-circuiting ring) in the starting position.

FIG. 2 is a longitudinal section through the slip-ring configuration and the short-circuiting and brush-lifting device of an asynchronous on a different scale.

FIG. 3 is another view of part of the device of FIG. 1.

FIG. 4 is a view of the device from section IV—IV of FIG. 1.

DETAILED DESCRIPTION

Figure 5:
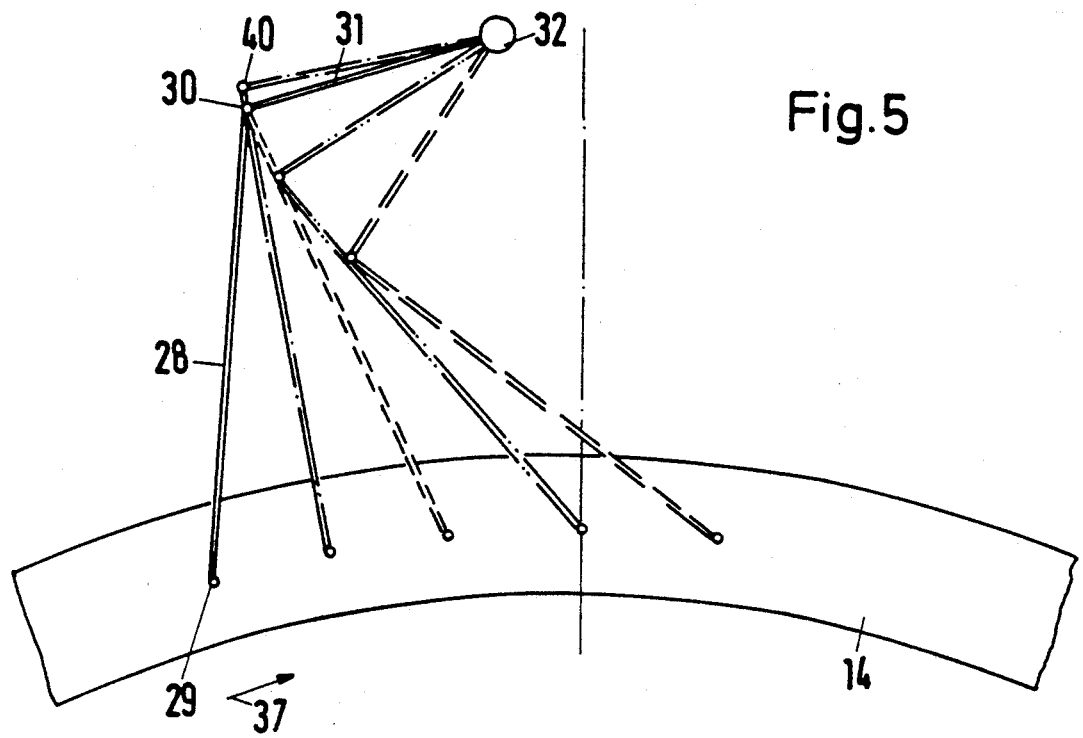
FIGS. 5 and 6 are basic representations to of the sequence of movements of the brush-actuating rod (FIG. 5) and the axial guide rods (FIG. 6) during short-circuiting.

Referring to FIG. 2, situated on the rotor shaft 1 of an asynchronous motor is a hub member 2 with three slip rings 3, which are connected to the rotor winding in a manner not shown. At several locations, axially running bolts 4 are connected to the slip rings 3. These bolts 4 extend right through two of the slip rings 3, with insulation, via an insulating conduit 5 and electrically contact the third slip ring (3a in FIG. 2). On the end face turned toward the end shield 6, the bolts 4 support a short-circuit contact 7.

Situated opposite each short-circuit contact 7 is a short-circuit contact 8, which is located on the end face 9 of a short-circuiting ring 10. The short-circuiting ring 10 is supported on slide pins (not shown) and connected via a rotor outer cover 11 to the hub member 2 and the rotor shaft 1. Thus, the short-circuiting ring 10 rotates with this rotor shaft 1 and with the slip rings 3. In addition, the short-circuiting ring 10 is prestressed by springs 12 (indicated symbolically in FIG. 2) in the direction of the short-circuit contacts 7 on the bolts 4.

The short-circuiting ring 10 can be displaced in the axial direction, and this controlled displacement is performed by the short-circuiting and brush-lifting device 13. The short-circuiting ring 10 works together with an actuating ring 14, which surrounds the rotor shaft 1 and can twist between a starting position and an operating position. The short-circuiting and brush-lifting device 13 only induces the brushes 15 to lift up from the slip rings 3 when these slip rings have been short-circuited by the short-circuiting ring 10.

On the inner surface 16 (see FIG. 1), its actuating ring 14 bears three rollers 18, which are distributed uniformly over its periphery, each on radially aligned axes 17. The surface area 19 of each of the rollers 18 abuts in the starting position on the end face 9 of the short-circuiting ring 10 facing the slip rings 3. Consequently, the rollers 18 retain the short-circuiting ring 10 against the force of the springs 12. In the starting position, a clearance 20, indicated by arrows in FIG. 2, remains between the short-circuiting contacts 7 of the slip rings 3 and the short-circuit contacts 8 of the short-circuiting ring 10. This clearance 20 is smaller than the axial movement toward the slip rings 3 that is executed by the actuating ring 14 during the rotation in the short-circuiting direction between the starting position and the operating position.

The actuating ring 14 is suspended in three radially aligned guide rods 21 (radial rods), which are uniformly distributed over the periphery and are permanently fixed on one side. To this end, the radial rods 21 are secured in each case by the articulated joint 22 to an actuating ring 14, and the other articulated joint 23 is permanently affixed to the end shield 6. Two of the radial rods 21 have the same rigid length, while a spring 24 makes the third radial rod 21a variable in length.

Furthermore, three more axially running guide rods 25 (axial rods), which are aligned perpendicularly to the radial rods 21 and are uniformly distributed over the periphery of the actuating ring. The axial rods 25 are secured by the articulated joint 26 to the actuating ring 14, while the outer articulated joint 27 is permanently affixed to the end shield 6. As a result of the axial alignment of the three equal-length axial rods 25, the actuating ring 14 is guided exactly parallel to the axis of the rotor shaft 1 but can move in the axial direction.

Finally, corresponding to the number of brushes existing in the asynchronous motor, brush-actuating rods 28 are also secured by an articulated joint 29 to the actuating ring 14. The other articulated joint 30 of the brush-actuating rod 28 abuts in each case on a lever 31 (see FIG. 1), which is clamped to the permanently fixed brush-holder stud 32. The brush-actuating rod 28 can, therefore, follow a movement of the actuating ring 14 by deflecting its articulated joint 30, whereby the brush-holder stud 32 is turned via the lever 31 and the brushes 15 situated in a brush holder 33 can also be lifted from the slip-ring surface 34. (See FIG. 3)

The articulated joints 22, 23, 26, 27 and 29, 30 are only indicated schematically in each case in FIGS. 1 and 2. In designing the short-circuiting and brush-lifting device 13 so that it will be subjected to the lowest possible rate of friction and wear, all the articulated joints 22, 23, 26, 27, 29, 30 are each provided with ball-joint heads. The guide rods 21, 25, 28 are each designed to be adjustable in length, so that in each case their same lengths can be exactly adjusted during assembly.

In order to turn the short-circuiting and brush-lifting device 13 via the actuating ring 14 out of the starting position and operating position and back, a lifting-spindle driving mechanism 35 is provided. The lifting-spindle driving mechanism 35 introduces a tangential motor-driven or manually driven force via the eye 36 to the actuating ring 14. In the end positions, the actuating ring 14 is retained in each case by the self-locking action of the lifting-spindle driving mechanism 35.

Figure 6:
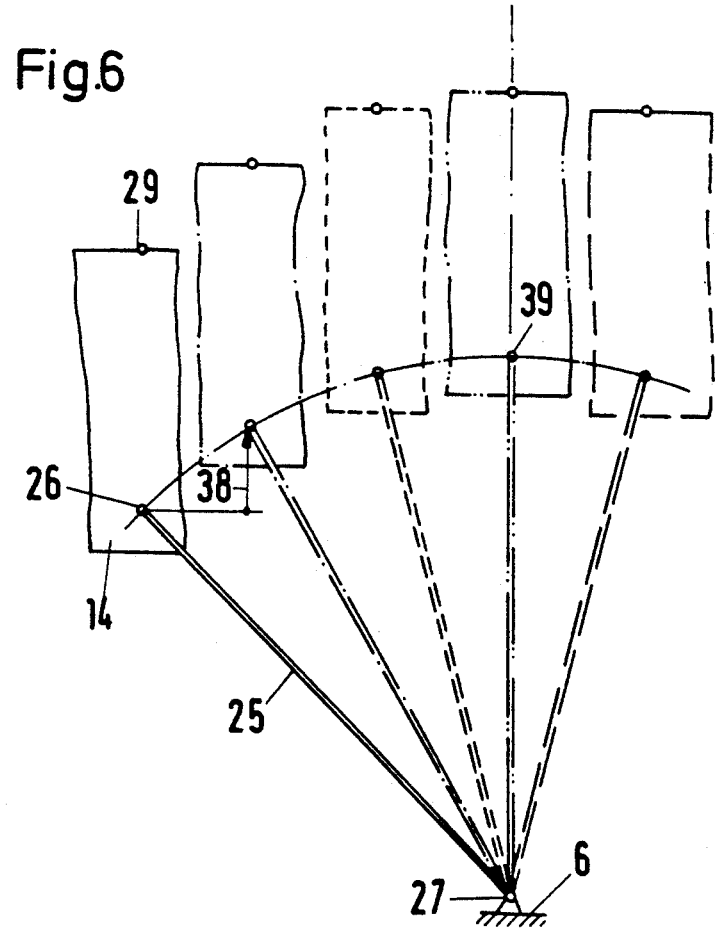

Referring to FIGS. 5 and 6, the operation of the short-circuiting and brush-lifting device is shown in greater detail. It should be remembered that the brush-actuating rods 28 depicted in FIG. 5 are arranged in a direction perpendicular to the axial rods 25 depicted in FIG. 6. Accordingly, different axial views of the actuating ring 14 are depicted in FIG. 6, showing different positions and depicting the ring in various ways, while, perpendicular to this, the view of the actuating ring 14 in FIG. 5 remains unchanged in relation to the axial position of the articulated joint 29 and, therefore, is only depicted as a solid line.

When the asynchronous motor is at standstill, the short-circuiting and brush-lifting device 13 is situated in its starting position, in which the axial rods 25 and the brush-actuating rods 28, as well as the actuating ring 14 take up a specific position, as depicted with a solid line in the basic representations of FIGS. 5 and 6. In this position, the surface areas 19 of the rollers 18 of the actuating ring 14 abut on the end face 9 of the short-circuiting ring 10. The short-circuiting contacts 7 of the bolts 4 of the slip rings 3 and the short-circuiting contacts 8 on the short-circuiting ring 10 show the clearance 20 between them. The slip rings 3 are, therefore, not short-circuited. Rather, in this position of the brush-actuating rods 28, the brushes 15 rest on the slip-ring surface 34, so that the asynchronous motor can run up to speed over resistance.

When the asynchronous motor runs up to speed, the rotor shaft 1 begins to rotate, together with the slip rings 3 and the short-circuiting ring 10. In addition, this short-circuiting ring 10 rotates the rollers 18 of the short-circuiting and brush-lifting device 13, so that no relative movement occurs between the axes of the rollers 18 and the short-circuiting ring 10. The advantage is that the rollers 18 are accelerated gradually, and not abruptly.

After the rated speed of the asynchronous motor is reached, to make the transition to rated operation, the actuating ring 14 is turned via the lifting spindle drive 35 in the short-circuiting direction 37, as indicated in FIG. 5 by the arrow.

As a result of this rotation of the actuating ring 14, each axial rod 25 moves initially from the position depicted with a solid line in FIG. 6 to the position indicated by a dot-dash line. This necessitates a relatively large axial displacement 38 of the actuating ring 14, as marked by an arrow, since the position of the movable articulated joints 26 and of the fixed articulated joints 27 is selected so that, during this movement, the axial rod 25 will still be very distant from the point of maximum excursion 39 of the deflecting movement of the articulated joint 26.

It is assumed in this case that as a result of this axial displacement 38 of the short-circuiting ring 10, the clearance 20 between the short-circuit contacts 7 of the slip rings 3 and the short-circuit contacts 8 of the short-circuiting ring 10 is reduced to zero. As a result, the short-circuit contacts 7 and 8 make contact with one another, whereby the springs 12 generate the contact pressure. The slip rings 3 and thus the rotor winding are, therefore, short-circuited.

When the brush-actuating rod 28 is situated perpendicularly to the axial rod 25, only a very small deflection of the movable articulated joint 30 is effected during the transition from the position depicted with a solid line to the position indicated by a dot-dash line (FIG. 5), since this articulated joint 30 reaches the point of maximum excursion 40 of its displacement. Because the movement to the point of maximum excursion 40 is so small, the lever 31 and thus the brush-holder stud 32 are hardly turned, and the brushes 15 continue to rest on the slip-ring surface 34.

After the actuating ring 14 rotates further in the short-circuiting direction 37 by an equal amount, the position depicted with a short-dashed line is now reached. During this rotation, the articulated joint 30 of the brush-actuating rod 28 has distanced itself again from the point of maximum excursion 40 and has virtually returned to its starting position. The brushes 15 rest, unaltered, on the slip-ring surface 34. However, as a result of the rotation of the axial rod 25, the actuating ring 14 continues to be displaced, although by a smaller axial amount, and the rollers 18 move accordingly. Since the short-circuiting ring 10 abuts with spring loading on the short-circuit contacts 7, the surface areas 19 move away from the end face 9 of the short-circuiting ring 10. Thus, the rollers 18 lift up from the short-circuiting ring. The rotation of the rollers 18 gradually slows down at this time.

As the actuating ring 14 continues to rotate in the short-circuiting direction 37 from the position depicted by short-dashed lines into the position illustrated with a dot-dot-dashed line, the movable articulated joint 26 of the axial rod 25 reaches the point of maximum excursion 39, while the actuating ring 14 moves only very little in the axial direction. On the other hand, the brush-actuating rod 28 transitions from the short-dashed line position to the dot-dot-dashed line position causing the lever 31 and, accordingly, the brush-holder stud 32 to turn considerably more, and the brush 15 begins to lift up from the slip-ring surface 34.

To ensure that the brushes 15 have a large enough clearance from the slip-ring surface 34 for the rated operation and in the worn-out state as well, the actuating ring 14 is rotated further, by an equal amount in the short-circuiting direction 37. The brush-actuating rod 28 moves thereby into the position depicted with long dashes. This again causes the lever 31 and the brush-holder stud 32 to rotate by a relatively large amount, so that the end position of the brushes is reached for the short-circuited operation of the asynchronous motor. Therefore, no brush wear occurs in the normal operation of the asynchronous motor with a short-circuited rotor winding.

During this last movement, the rollers 18 on the actuating ring 14 return somewhat in the axial direction as a result of the rotation of the axial rod 25 beyond the point of maximum excursion 39. However, the rollers 18 still show a clearance from the end face 9 of the short-circuiting ring 10, so that the rollers 18 are not rotating during rated operation.

I claim:

1. A short-circuiting, brush-lifting device coupled within an asynchronous motor that includes a slip-ring rotor having a central axis and a plurality of slip rings, said short-circuiting, brush-lifting device comprising:

a plurality of short-circuit contacts statically mounted to said slip rings of said slip-ring rotor;

a short-circuiting ring having a central axis substantially coincident to the central axis of said slip-ring rotor, said short circuiting ring coupled around said slip-ring rotor and capable of movement in an axial direction, said short-circuiting ring capable of being electrically coupled to said short-circuit contacts;

means for triggering an axial displacement of said short-circuiting ring into electrical contact with said short-circuit contacts, such that electrical contact between said short-circuit contacts and said short-circuiting ring causes said slip rings of said slip-ring rotor to become short-circuited;

a rotatably supported actuating ring having a central axis substantially coincident to that of said slip-ring rotor, said actuating ring coupled around said slip-ring rotor and capable of rotational movement from a starting position to an operating position in a circumferential direction around the central axis of said actuating ring, said actuating ring also capable of movement in an axial direction from said starting position to said operating position;

a plurality of brush-actuating guide rods, each being substantially equal in length and including a first articulated joint and a movable articulated joint, each brush-actuating guide rod coupled to said actuating ring via said first articulated joint;

a plurality of brushes capable of being coupled to said slip rings of said slip-ring rotor;

a plurality of holder studs coupled to said plurality of brushes;

a plurality of levers coupled between said plurality of holder studs and the first articulated joints of said brush-actuating guide rods, such that movement of said brush-actuating guide rods is capable of causing said holder studs to rotate and said brushes to become lifted and disconnected from said slip rings when said slip rings have been short circuited, such that when said actuating ring is moved from said starting position to said operating position said short-circuit contacts electrically contact said short-circuiting ring and said brushes are disconnected from the slip rings of said slip-ring rotor;

a plurality of axially aligned axial guide rods, each being substantially equal in length and each including a fixed articulated joint and a movable articulated joint, each movable articulated joint of said axial guide rods being coupled to and uniformly distributed over an outer circumferential surface of said actuating ring, said brush-actuating guide rods being aligned perpendicularly to said axial guide rods;

a plurality of rollers, each having a radial axis and being uniformly distributed over an inner surface of said actuating ring, a surface area of each roller abutting against an end face of said short-circuiting ring that faces said slip rings on said slip-ring rotor in said starting position;

a plurality of springs coupled to said short-circuiting ring, said springs urging said short-circuiting ring towards said rollers and said short-circuit contacts;

such that the movable articulated joints of said brush-actuating guide rods are capable of being deflected to a first point of maximum excursion where the movable articulated joints of said brush-actuating guide rods are at a maximum distance from said actuating ring;

such that the movable articulated joints of said axial guide rods are capable of being deflected to a second point of maximum excursion where said actuating ring is at a maximum displacement in an axial direction from said starting position;

such that said brush-actuating guide rods and said axial guide rods are positioned such that the movable articulated joints of said brush-actuating guide rods are deflected through said first point of maximum excursion before the movable articulated joints of said axial guide rods are deflected through said second point of maximum excusion; and such that an axial displacement of said actuating ring in said operating position is larger in magnitude than a displacement between said short-circuit contacts and the end face of said short-circuiting ring in said starting position.

2. The short-circuiting and brush lifting device of claim 1 further comprising:

three radially aligned guide rods supporting said actuating ring, each including articulated joints and being uniformly distributed over an outer peripheral surface of said actuating ring.

3. The short-circuiting and brush-lifting device of claim 2, wherein two of said radially aligned guide rods have a constant length and one of said axial guide rods has a variable length.

4. The short-circuiting and brush-lifting device of claim 3, wherein said variable length radially aligned guide rod includes a spring.

5. The short-circuiting and brush-lifting device of claim 1, wherein the articulated joints of said brush-actuating guide rods and said axial guide rods are articulated joints with ball-joint heads.

6. The short-circuiting and brush-lifting device of claim 2, wherein the articulated joints of said brush-actuating guide rods, said axial guide rods, and said radially aligned guide rods are articulated joints with ball-joint heads.

7. The short-circuiting and brush-lifting device of claim 3, wherein the articulated joints of said brush-actuating guide rods, said axial guide rods, and said radially aligned guide rods are articulated joints with ball-joint heads.

8. The short-circuiting and brush-lifting device of claim 4, wherein the articulated joints of said brush-actuating guide rods, said axial guide rods, and said radially aligned guide rods are articulated joints with ball-joint heads.

9. The short-circuiting and brush-lifting device of claim 1, wherein rotation of said actuating ring is triggered by a tangentially introduced force.

10. The short-circuiting and brush-lifting device of claim 2, wherein rotation of said actuating ring is triggered by a tangentially introduced force.

11. The short-circuiting and brush-lifting device of claim 8, wherein rotation of said actuating ring is triggered by a tangentially introduced force.

12. The short-circuiting and brush-lifting device of claim 9 further comprising a lifting-spring driving mechanism coupled to and operating said actuating ring.

13. The short-circuiting and brush-lifting device of claim 10 further comprising a lifting-spindle driving mechanism coupled to and operating said actuating ring.

14. The short-circuiting and brush-lifting device of claim 11 further comprising a lifting-spindle driving mechanism coupled to and operating said actuating ring.

15. The short-circuiting and brush-lifting device of claim 1 further comprising:

a plurality of slide pins coupled between said short-circuiting ring and said rotor shaft, said slide pins supporting said short-circuiting ring.

16. The short-circuiting and brush-lifting device of claim 2 further comprising:

a plurality of slide pins coupled between said short-circuiting ring and said rotor shaft, said slide pins supporting said short-circuiting ring.

17. The short-circuiting and brush-lifting device of claim 5 further comprising:

a plurality of slide pins coupled between said short-circuiting ring and said rotor shaft, said slide pins supporting said short-circuiting ring.

18. The short-circuiting and brush-lifting device of claim 14 further comprising:

a plurality of slide pins coupled between said short-circuiting ring and said rotor shaft, said slide pins supporting said short-circuit ring.

* * * * *